Figure 1:
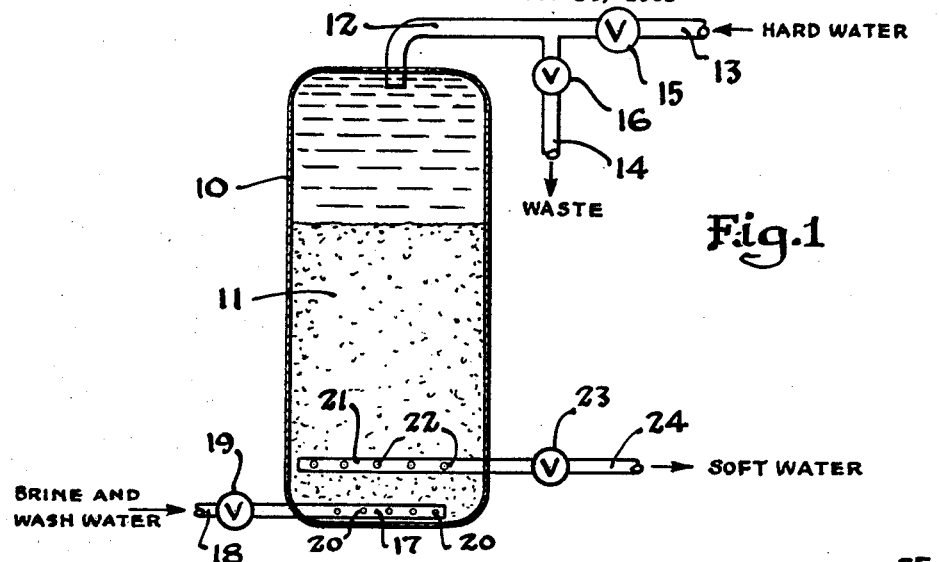

April 14, 1964    N. A. JOHNSON    3,129,169
WATER SOFTENER REGENERATION METHOD AND APPARATUS
Filed Dec. 14, 1961

Inventor
Nels A. Johnson
By Darbo, Robertson & Vandenburgh
Attorneys

United States Patent Office 3,129,169
Patented Apr. 14, 1964

3,129,169
WATER SOFTENER REGENERATION METHOD
AND APPARATUS
Nels A. Johnson, 154 W. Chicago Ave., Palatine, Ill.,
assignor of one-half to George M. Munson, West Chicago, Ill.
Filed Dec. 14, 1961, Ser. No. 159,308
7 Claims. (Cl. 210—32)

The present invention relates to a method of operating and regenerating water softeners of the ion exchange type and an apparatus utilizing the method.

In a base exchange water softener, as for example of the zeolite type, the ion exchange material must be periodically treated with brine, e.g., a solution of sodium chloride, to regenerate the material. The sodium of the brine expels the calcium and/or magnesium removed from the hard water during the softening process. The bed of softening material then must be washed to remove excess brine and the expelled calcium and/or magnesium.

The normal hard water supply is used to provide water for the washing of the treating bed during the washing portion of the cycle. In the usual water softening device the wash water enters one end of the bed and is discharged from the bed at the other end thereof. Since the wash water is hard water, the calcium and/or magnesium therein will exchange with the sodium in the ion exchange material. Since the amount of wash water employed is relatively small as compared to the treating capacity of the bed, no consideration has been given in the past to the consequences occasioned by this wash water passing through the bed. I have discovered, however, that during the washing process the ion exchange material at the end of the bed into which the wash water is introduced, for all practical purposes, will take up substantially its full capacity of calcium and/or magnesium (hereinafter referred to as exhausting the capacity of the material).

At first blush it might appear that the only effect thereof would be to reduce the quantity of active ion exchange material remaining for effectively softening water during the water softening portion of the cycle. However, I have further discovered an additional deleterious result that occurs by reason of the exhausting of the treating capacity of the ion exchange material at the end of the bed into which the wash water is introduced. In the usual reverse flow softener the hard water to be softened is introduced into the bed at the end thereof opposite that at which the wash water is introduced, and the treated soft water removed from the end of the bed at which the ion exchange material has been exhausted during the washing portion of the cycle. The result is that while the hard water during the softening portion of the cycle is softened as it passes through the active, non-exhausted, portion of the bed, that softened water will again pick up some of the magnesium and/or calcium present in the material at the end of the bed exhausted during the washing part of the cycle. Thus, the water being treated actually is rehardened by its passage through the initially exhausted portion of the bed. While the water removed from the treating chamber is very much softer than was the hard water introduced into the treating chamber, it is not as soft as it would be had it not passed through that portion of the bed in which the capacity of the ion exchange material was substantially exhausted during the washing part of the cycle. The present method and apparatus are directed toward the elimination of this rehardening of the water.

This is achieved in the method I have devised by passing the hard water to be treated during the softening portion of the cycle through only a portion of the complete bed, that portion being one in which the capacity of the treating material was not exhausted or substantially reduced by the wash water in the washing part of the cycle. During the washing part of the cycle the wash water is introduced into the remaining part of the bed not utilized during the softening part of the cycle and from this latter bed portion is then passed through the part of the bed used during the treating portion of the cycle. Thus, to the extent that the capacity of a part of the bed is exhausted during the washing cycle, this will have no effect upon the extent to which water is softened by the remainder of the bed during the water softening portion of the cycle.

To give a more specific example of the application of my process assume that a vertical bed of treating material is employed. During regeneration the brine and wash water is passed through the entire bed from one end to the other, e.g., from bottom to top. During the softening part of the cycle the hard water is introduced into the bed in the reverse direction, e.g., the flow being from the top towards the bottom. However, the soft water is withdrawn from the bed at a level spaced from the end of the bed into which the brine and wash water previously had been introduced, e.g., at a level somewhat above the bottom of the bed. The term "bed" is used herein to refer to that portion of the treating material, normally all of the treating material, through which liquid flows during any part of the complete cycle of water softening, regeneration and washing.

Figure 2:
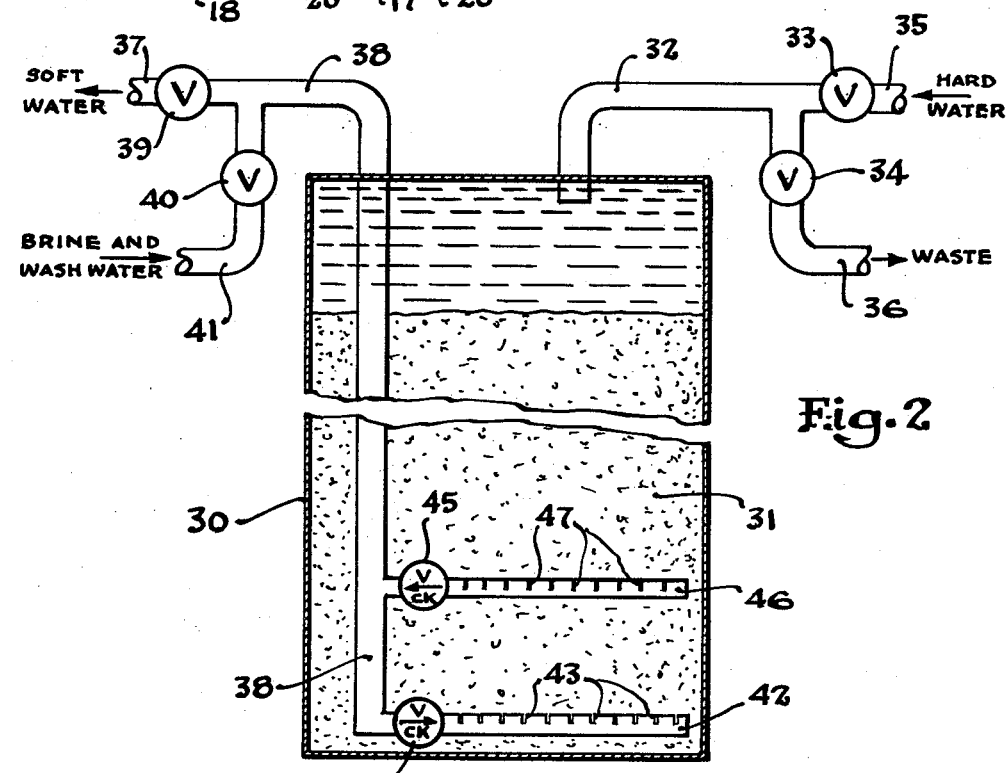

Further objects and advantages of the invention, as well as details of the application of the process I have devised, will be apparent from the following description of apparatus embodying my invention in which:

FIGURE 1 is a diagrammatic sectional view of a water softener incorporating my invention; and FIGURE 2 is a diagrammatic sectional representation of a second embodiment of the invention.

In FIGURE 1 the apparatus comprises a container or tank 10 in which is a bed 11 of an ion exchange material. A pipe 12 extends from the top of the container and has two branches 13 and 14 in which are valves 15 and 16, respectively. At the bottom of the container is a distributor 17 which communicates with a pipe 18 through a valve 19. Distributor 17 has a plurality of openings 20 therein through which liquid can flow between the interior of the distributor and the interior of the tank 10. Above the level of distributor 17 is a second distributor 21 hving a plurality of openings 22 therein. The interior of distributor 22 communicates through valve 23 to a pipe 24.

During the normal softening of water valves 15 and 23 are open while valves 16 and 19 are closed. Hard water is introduced through pipe 13 from which it flows through the portion of the bed of zeolite lying above distributor 21 and thence into openings 22 and out pipe 24. When regeneration is required, valves 15 and 23 are closed while valves 16 and 19 are opened. The brine for regeneration is introduced through pipe 18 and distributor 17. After regeneration, the wash water is introduced through pipe 18 and allowed to run out through pipes 12 and 14. Thus, the wash water entering the bed through openings 20 in distributor 17 will pass through the portion of the bed lying below distributor 21 before reaching that part of the bed lying above distributor 21. To the extent that the wash water depletes the water softening capacity of some of the material of the bed, it will be that ion exchange material lying below distributor 21. By the time that the wash water rises to the level of distributor 21 it will be already softened so that it has no effect upon the softening capacity of that part of the bed lying above distributor 21. Of course, when the wash cycle is complete valves 16 and 19 are closed and valves 15 and 23 are reopened for the normal water softening part of the cycle.

In the embodiment illustrated in FIGURE 2 only two pipes are required to enter the tank 30 holding the bed 31 of ion exchange material. A pipe 32 communicates with the interior of tank 30 adjacent the top thereof and with two valves 33 and 34. In turn, valve 33 communicates with a pipe 35 while valve 34 communicates with pipe 36. A soft water outlet pipe 37 communicates with pipe 38 through a valve 39. A valve 40 is interposed between pipe 38 and a brine and wash water inlet pipe 41.

At the bottom of tank 30 is an outlet distributor 32 having a plurality of saw slots 43 therein to serve as distributor openings. The interior of distributor 42 communicates with pipe 38 through a check valve 44. Check valve 44 is so mounted that liquid will flow through it only in the direction of from pipe 38 to distributor 42.

A reversely connected check valve 45 is mounted between pipe 38 and distributor 46. In this case the check valve 45 only will permit flow of liquid from distributor 46 to pipe 38. Distributor 46 has a plurality of saw slits 47 therein to serve as distributor openings. The proportions of the parts, e.g., the saw slits, and the distance of separation of the parts, etc., are for purposes of illustration only. The exact sizes readily can be worked out by those skilled in the art.

During the water softening cycle valves 33 and 39 are opened while valves 34 and 40 are closed. The hard water enters through pipe 35 and flows downwardly through bed 31 until reaching distributor 46. Thereafter the softened water flows out through check valve 45, pipe 38 and pipe 37. When the bed is to be regenerated valves 33 and 39 are closed while valves 34 and 40 are opened. A brine is introduced into the tank through pipe 41 to regenerate the whole of the bed. After regeneration, wash water is introduced through pipe 41, pipe 38, check valve 44 and distributor 42. The wash water flows out of the tank through pipe 32 and pipe 36. Again, to the extent that it is necessary to deplete the softening capacity of a portion of the bed by the introduction of hard water during the washing part of the cycle, only the portion of the bed lying below the distributor 46 will be affected. This portion of the bed, however, is not utilized during the water softening part of the cycle, since only the part of the bed lying above distributor 47 will have the water flowing through it during the latter part of the cycle.

The foregoing description of specific embodiments of my invention is for the purpose of complying with 35 U.S.C. 112 and should not be construed as imposing unnecessary limitations upon the appended claims. Modifications and variations of the described specific embodiments will be apparent to those skilled in the art or subsequently devised by them.

For example, in some softeners the brine is not formed outside the softener container but is produced inside by introducing salt directly therein. The salt goes into solution in the water in the container to form the brine. My invention may be utilized with such a softener. After the bed of ion exchange material has been so regenerated the wash water is introduced into the bed at one end and removed at the other end. Following the washing period the hard water to be softened is introduced at said other end and removed from the bed before it reaches said one end. This can be achieved with either of the embodiments of FIGURES 1 and 2, assuming that an opening in the container is present for the direct introduction of the salt.

I claim:

1. In the method of softening water in a bed of ion exchange material and regenerating said material with a brine, the improvement comprising: regenerating the bed by flowing brine therethrough; thereafter washing the regenerated material by introducing wash water at one end of the bed and withdrawing the wash water from the other end of the bed; and thereafter softening water by introducing the water to be softened into said material at said other end of the bed and withdrawing the softened water from said bed at an area in said bed spaced from said one end of the bed.

2. In the method of softening water in a bed of ion exchange material and regenerating said material with a brine, the improvement comprising: softening the hard water by flowing the hard water in one direction through only a part of the bed and withdrawing the softened water from the bed before reaching the end of the bed in said direction; and after said material has been regenerated by brine, flowing the wash water through the bed in the reverse direction with said reverse flow entering the bed in a portion thereof prior to reaching said part of the bed.

3. In the method of softening water using an ion exchange material in repetitive cycles in which water is softened by passing hard water through the material, the material is regenerated with brine and then the regenerated material is washed, the improvement comprising: during the water softening part of the cycle passing the hard water through only a first portion of said material to soften the water; during the washing part of the cycle passing the hard wash water first through a second portion of said material and then through said first portion; and during the regeneration part of the cycle introducing the brine into both portions of said material.

4. In an apparatus for softening hard water comprising a container with a bed of ion exchange material therein which is regenerated with a brine the improvement including: means to introduce the hard water to be softened into said container at one end of said bed and to remove the softened water from the container at a first point in said bed spaced inwardly from the opposite end of said bed; and means to introduce brine and wash water into said bed at a second point in the bed farther from said one end than is said first point and to remove said brine and wash water from said container at said one end of said bed.

5. In an apparatus for softening hard water comprising a container with a bed of ion exchange material therein which is regenerated with a brine, the improvement including: hard water inlet means at one end of said bed; waste wash water outlet means at said one end of bed; wash water inlet means at the other end of the bed; and soft water outlet means between the ends of the bed.

6. In an apparatus for softening hard water comprising a container with a bed of ion exchange material therein which is regenerated with a brine, the improvement including: hard water inlet means at the top of the container; waste wash water outlet means at the top of the container; brine and wash water inlet and distributor means at the bottom of the container; and soft water distributor and outlet means in said bed above the bottom thereof.

7. In an apparatus for softening hard water comprising a container with a bed of ion exchange material therein which is regenerated with a brine, the improvement including: hard water inlet means at one end of said bed;

waste wash water outlet means at said one end of the bed; a conduit extending into said container; a distributor in the bottom of said container and connected to said conduit; a check valve between said distributor and said conduit to limit the fluid flow between the two to flow from the conduit to the distributor; a second distributor in said bed above the bottom thereof and connected to said conduit; and a check valve between the second distributor and the conduit to limit the fluid flow between the two to flow from the second distributor to the conduit.

References Cited in the file of this patent

UNITED STATES PATENTS

| | | |
|---|---|---|
| 2,217,692 | McGill | Oct. 15, 1940 |
| 2,692,244 | Kunin et al. | Oct. 19, 1954 |
| 2,771,424 | Stromquist et al. | Nov. 20, 1956 |
| 3,021,276 | Mast | Feb. 13, 1962 |